US012632582B2

(12) United States Patent
Wen et al.

(10) Patent No.: US 12,632,582 B2
(45) Date of Patent: May 19, 2026

(54) CONTROLLING ACCESS AND UTILIZATION OF DATA BASED ON COMPUTERIZED GENERATION OF DATA USAGE CONTROLS

(71) Applicant: International Business Machines Corporation, Armonk, NY (US)

(72) Inventors: Bo Wen, Chappaqua, NY (US); Nigel Hinds, Great Barrington, MA (US); Jeffrey L. Rogers, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 18/592,792

(22) Filed: Mar. 1, 2024

(65) Prior Publication Data

US 2025/0278502 A1 Sep. 4, 2025

(51) Int. Cl.
*G06F 21/62* (2013.01)
(52) U.S. Cl.
CPC .............................. *G06F 21/6218* (2013.01)
(58) Field of Classification Search
CPC .................................................. G06F 21/6218
See application file for complete search history.

(56) References Cited

U.S. PATENT DOCUMENTS

| | | | |
|---|---|---|---|
| 8,041,749 | B2 | 10/2011 | Beck |
| 10,404,757 | B1 | 9/2019 | Horton |
| 10,929,338 | B2 | 2/2021 | Kohl et al. |
| 2020/0410170 | A1 | 12/2020 | Good et al. |

OTHER PUBLICATIONS

Dua (Amy O'Hara, Chapter 3 Model Data Use Agreements: A Practical Guide (Year: 2020).*
Amy O'Hara. 2020. "Model Data Use Agreements: A Practical Guide." In: Cole, Dhaliwal, Sautmann, and Vilhuber (eds), Handbook on Using Administrative Data for Research and Evidence-based Policy, https://admindatahandbook.mit.edu/book/v1.0-rc4/dua.html, 16 pages.
Handbook on Using Administrative Data for Research and Evidence-based Policy, 2020, https://admindatahandbook.mit.edu/, pp. 1-150.

(Continued)

*Primary Examiner* — Brian F Shaw
(74) *Attorney, Agent, or Firm* — Harrity & Harrity, LLP

(57) ABSTRACT

An embodiment of the present invention includes a system for controlling access and usage of data. The system comprises one or more memories, and at least one processor coupled to the one or more memories. The system generates a data usage configuration from a document specifying requirements for a dataset in a natural language. The data usage configuration indicates access and operations for the dataset. The dataset is retrieved from a data storage unit in accordance with the data usage configuration. The operations performed on the dataset are controlled based on the data usage configuration. Embodiments of the present invention further include a method and computer program product for controlling access and usage of data in substantially the same manner described above.

24 Claims, 7 Drawing Sheets

(56)  References Cited

OTHER PUBLICATIONS

Handbook on Using Administrative Data for Research and Evidence-based Policy, 2020, https://admindatahandbook.mit.edu/, pp. 151-300.
Handbook on Using Administrative Data for Research and Evidence-based Policy, 2020, https://admindatahandbook.mit.edu/, pp. 301-450.
Handbook on Using Administrative Data for Research and Evidence-based Policy, 2020, https://admindatahandbook.mit.edu/, pp. 451-615.

* cited by examiner

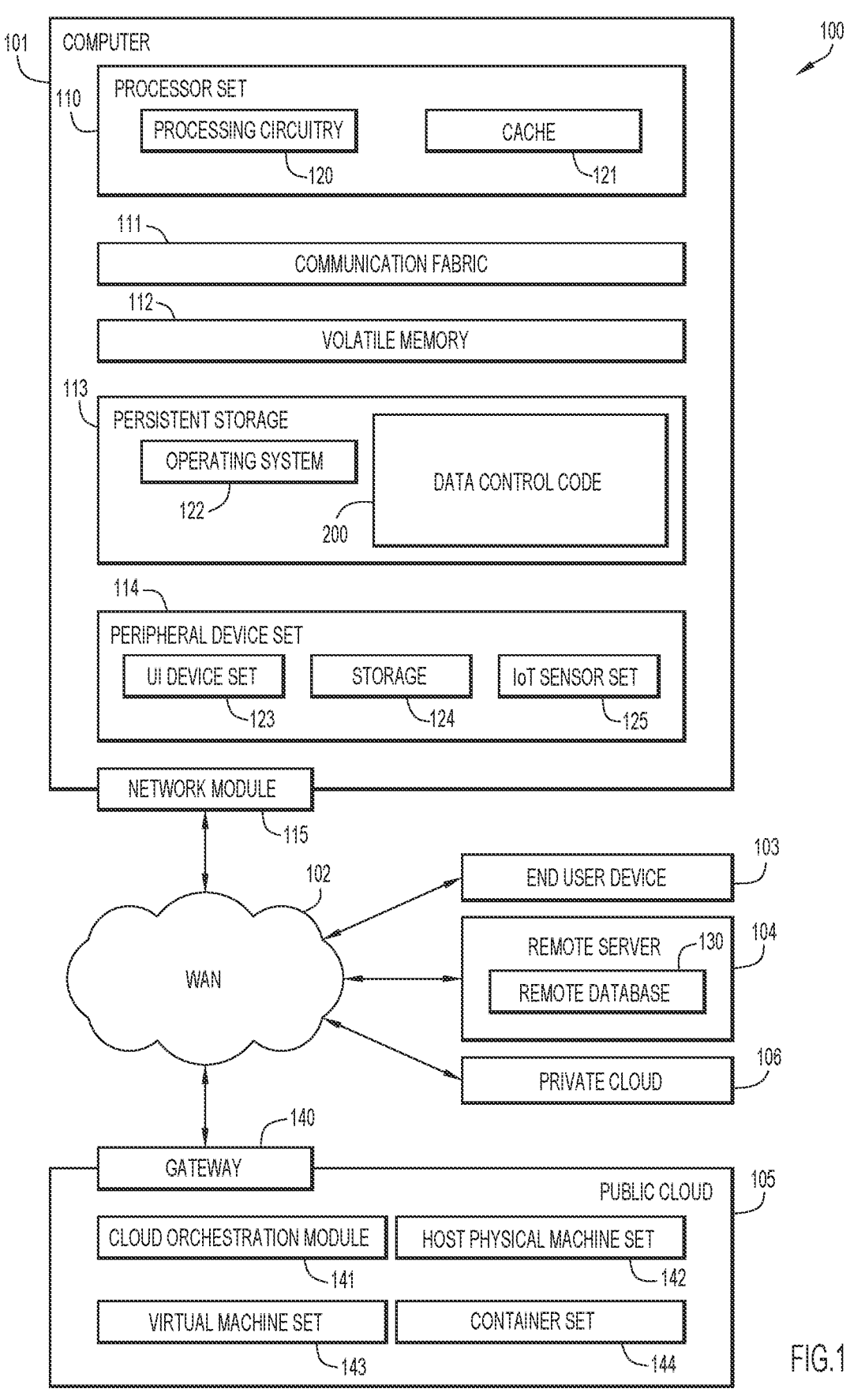

101 COMPUTER

100

110 PROCESSOR SET

PROCESSING CIRCUITRY
120

CACHE
121

111 COMMUNICATION FABRIC

112 VOLATILE MEMORY

113 PERSISTENT STORAGE

OPERATING SYSTEM
122

200

DATA CONTROL CODE

114 PERIPHERAL DEVICE SET

UI DEVICE SET
123

STORAGE
124

IoT SENSOR SET
125

NETWORK MODULE
115

102 WAN

END USER DEVICE
103

REMOTE SERVER
130
104

REMOTE DATABASE

PRIVATE CLOUD
106

140 GATEWAY

PUBLIC CLOUD
105

CLOUD ORCHESTRATION MODULE
141

HOST PHYSICAL MACHINE SET
142

VIRTUAL MACHINE SET
143

CONTAINER SET
144

USE THE ROLES, CREATE USER
GROUPS OR ROLES USING A
DATABASE OR OTHER MECHANISM — 505

CREATE ACCESS-CONTROLLED
FIELD CLASSES — 510

USING THE DATA DICTIONARY,
CREATE A DATABASE SCHEMA — 515

| ID | NAME | RULES |
|---|---|---|
| 001 | OWNER | RULE SET |
| 002 | EDITOR | RULE SET |
| 123 | PII_access | RULE SET |
| 456 | Non_PII_access | RULE SET |
| 789 | Limited_PII_access | RULE SET |

620

DATA USAGE CONFIG TABLE

610

USER

630

DATA USAGE CONFIG ID

DATASET

650

640

| user_id | dataset_id | DATA USAGE CONFIG ID |
|---|---|---|
| u312 | d134 | owner_config |
| u6254 | d763 | editor_config |
| u412 | d123 | config_123 |
| u753 | d7345 | config_456 |
| u6432 | d1234 | config_789 |

CONTROLLING ACCESS AND UTILIZATION OF DATA BASED ON COMPUTERIZED GENERATION OF DATA USAGE CONTROLS

BACKGROUND

1. Technical Field

Present invention embodiments relate to data access control, and more specifically, to computerized generation of data usage controls and controlling access and utilization of data based on the data usage controls.

2. Discussion of the Related Art

Data are governed by multiple rules from various entities, including data owners, local laws (e.g., Health Insurance Portability and Accountability Act (HIPAA) and General Data Protection Regulation (GDPR)), data users' institutional bylaws, contract terms between a data owner and a data user, etc.). These rules can change with time, as well as when data moves from one computer system to another, thereby requiring changes to a security and data control system accordingly to stay in compliance. However, the rules are in human natural language, thereby requiring significant time to change the security and data control system for rule changes and enabling the security and data control system to become out of compliance.

SUMMARY

According to one embodiment of the present invention, a system controls access and usage of data. The system comprises one or more memories, and at least one processor coupled to the one or more memories. The system generates a data usage configuration from a document specifying requirements for a dataset in a natural language. The data usage configuration indicates access and operations for the dataset. The dataset is retrieved from a data storage unit in accordance with the data usage configuration. The operations performed on the dataset are controlled based on the data usage configuration. Embodiments of the present invention further include a method and computer program product for controlling access and usage of data in substantially the same manner described above.

BRIEF DESCRIPTION OF THE DRAWINGS

Generally, like reference numerals in the various figures are utilized to designate like components.

FIG. 1 is a diagrammatic illustration of an example computing environment according to an embodiment of the present invention.

DETAILED DESCRIPTION

Figure 2:
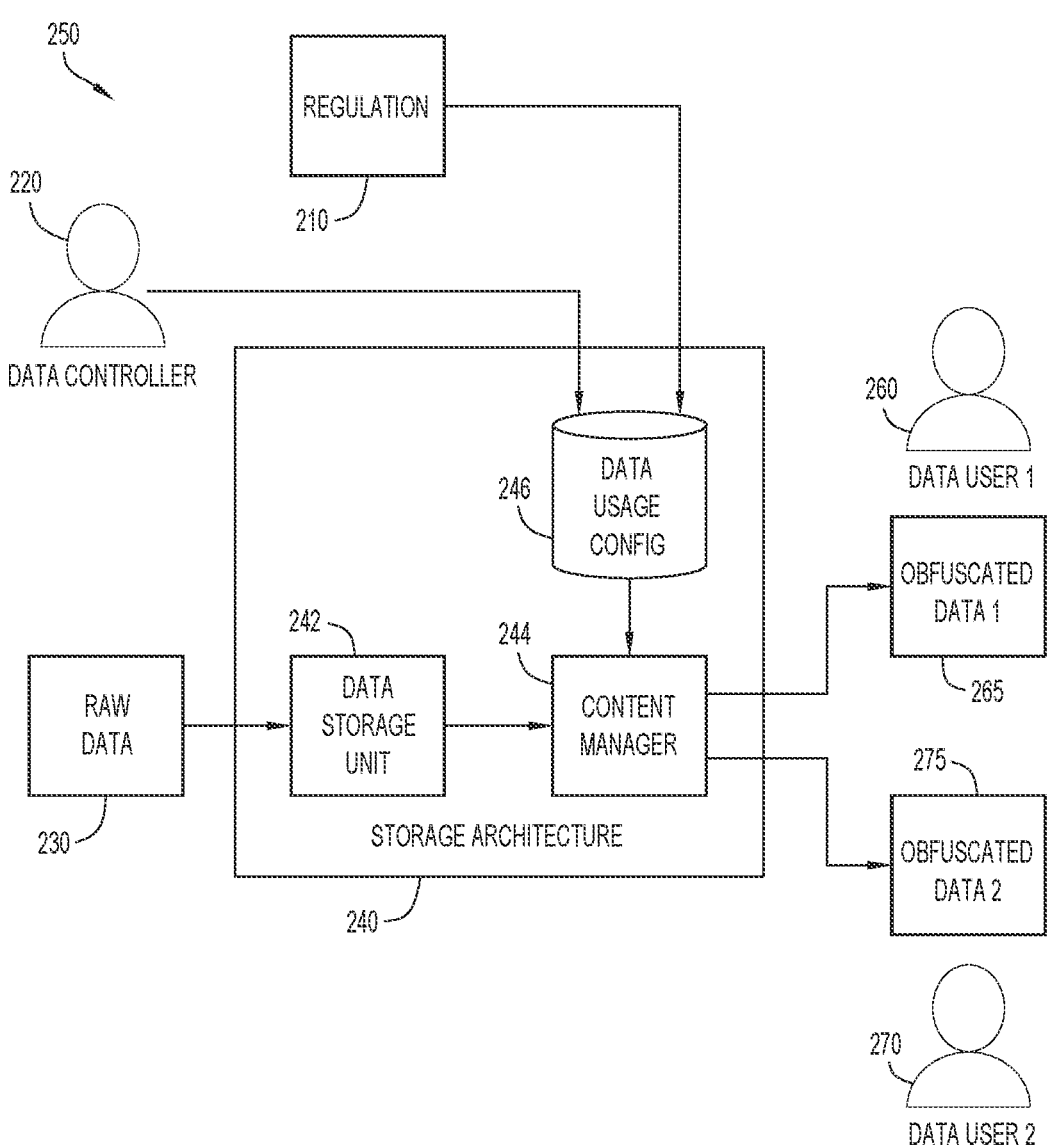
FIG. 2 is a flow diagram of a system for controlling data according to an embodiment of the present invention.

Embodiments of the present invention pertain to a secure data protection technique designed to safeguard sensitive information (e.g., protected health information (PHI), personal financial information (PFI), personally identifiable information (PII), etc.) to be in compliance with regulations or other requirements (e.g., Health Insurance Portability and Accountability Act (HIPAA), etc.).

An embodiment of the present invention includes a secure data storage unit and an information filtering mechanism. The data storage unit implements robust encryption techniques, user authentication and authorization, and real-time monitoring to prevent unauthorized access. The information filtering mechanism governs the data retrieval process through a content management system. It can provide multiple types of data masking/obfuscation operations based on user needs (e.g., replacing phone numbers by random strings, etc.) and based on the access level of the requester, ensuring the output data is compliant with regulation or other requirements.

In addition, the present invention embodiment includes a comprehensive audit trail, thereby ensuring complete transparency and accountability. The present invention embodiment implements a data usage configuration including data usage controls prescribing manners of controlling access and manipulation of data. The data usage configuration may be represented by metadata that is associated with a dataset (e.g., a computer readable format of a legal or other agreement).

A data usage configuration may represent a legal or other framework for data access. A subject or source with respect to a data usage configuration generally refers to a source of the data (e.g., for studies gathering data from human participants, the human participants are the subjects). An owner with respect to a data usage configuration generally refers to a party with a legal or other right to use the data and to define a data usage configuration for other uses. A collector with respect to a data usage configuration generally refers to a party capturing the data. This may be a separate organization from the data owner. A provider or custodian with respect to a data usage configuration generally refers to a party that receives the data from the collector and stores the original data. The provider is responsible for distributing the data as delegated by the owner. A requestor or consumer with respect to a data usage configuration generally refers to a party requesting or being granted access to the data under the data usage configuration. Once a consumer has a copy of the data, the consumer may become a custodian of some form. The data usage configuration describes the data offered (e.g., format, provenance, quality, access technique, etc.) by a provider and what a requestor may do with the data (e.g., scope of a study, restrictions on redistribution, security controls, constraints on publishing, etc.).

Present invention embodiments may be implemented in a multi-cloud environment to facilitate the scenario of distributed dataset handling, where a data provider, controller, and consumer are from different organizations and on different clouds.

An embodiment of the present invention may include a data control system that may be implemented as part of the content management system. The data control system generates a data usage configuration (e.g., represented by metadata) from regulatory or other requirements and attaches the metadata (or data usage configuration) with the actual dataset. A downstream runtime compute environment may use the information contained in the data usage configuration to enforce data governance and/or management. For example, some data governance and/or management operations may include: once the data usage configuration terminates and based on a termination agreement, all copies of the data are identified and quarantined (made unusable) or deleted; data copy or transfer events must consult the data usage configuration to verify the destination location is permitted; and based on sub-consumer roles, the data can be further limited (e.g. fields removed or values obfuscated).

The data control/regulation policy (or data usage configuration) may be attached with the data. When a user attempts to retrieve the dataset from the data storage unit, the user receives a capsule (e.g., a docker image), where the control logic controls how the data is to be accessed according to the policy even after the capsule is moved to a different cloud or compute environment.

An embodiment of the present invention includes a system for implementing a data usage configuration. The system comprises a data storage unit storing a sensitive dataset, a content management system controlling a data retrieval process with a data control/regulation policy attached as a data usage configuration with data usage controls; and an execution environment configured to apply the rules contained in the data usage configuration for enforcing data governance/management upon retrieval of the dataset. The data usage configuration may be a machine-readable format that manifests a legal agreement related to the dataset, and may instruct actions upon termination including sequestering or deleting all copies of the dataset. The content management system may utilize multiple types of data masking/obfuscation operations based on user needs and access level. The execution environment ensures that the metadata of the data usage configuration is collocated with any copies of the dataset, or any data manipulation mechanism can locate and access the data usage configuration for the dataset.

An embodiment of the present invention includes a method of implementing a data usage configuration. The method comprises creating data usage configuration metadata based on an owner's textual data access policy. A sensitive dataset is stored in a data storage unit, and a data retrieval process is controlled through a content management system and based on the data usage configuration metadata.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending on the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as data control code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A system for controlling data according to an embodiment of the present invention is illustrated in FIG. 2. A system 250 for controlling data includes a storage architecture 240 including a data storage unit 242 and a content manager 244. The storage architecture may include, or be implemented by, a content management system (e.g., computer 101 and/or remote server 104, etc.). The data storage unit stores raw data 230 from a data source, and may include, or be implemented by, any conventional or other data storage structure (e.g., database 130, etc.). Content manager 244 generates a data usage configuration 246 (e.g., including data usage controls, etc.) and controls access and usage of data from data storage unit 242 according to the data usage configuration. Content manager 244 may include, or be implemented by, data control code 200.

Raw data 230 from a data source is stored in data storage unit 242. The raw data may include various types of information (e.g., sensitive information (e.g., protected health information (PHI), personal financial information (PFI), personally identifiable information (PII), non-sensitive information, etc.). Content manager 244 receives requirements (e.g., permitted actions, prohibited actions, etc.) for the raw data from a regulation source 210 and/or a data controller 220. The regulation source may provide various legal, proprietary, or other regulations or requirements for raw data 230 (e.g., Health Insurance Portability and Accountability Act (HIPAA), General Data Protection Regulation (GDPR), data users' institutional bylaws, etc.). Further, data controller 220 (e.g., user, organization, or other entity) may provide requirements for raw data 230 (e.g., contract terms between a data owner and a data user, etc.). The requirements are typically textual (or in other human-readable forms), and may be provided by the regulation source, data controller, or combination thereof (e.g., documents prepared or distributed by the regulation source and/or data controller, etc.).

Content manager 244 receives the textual requirements from regulation source 210 and/or data controller 220 and generates a data usage configuration 246 (e.g., including data usage controls, etc.) for raw data 230. The data usage configuration may include a set of rules for access and utilization of the raw data by users 260, 270. Each user or dataset may be associated with a corresponding data usage configuration (e.g., set of rules or data usage controls). In an embodiment, content manager 244 may generate partitions in data storage unit 242 each associated with a data usage configuration and containing data complying with that data usage configuration (e.g., data usage controls or set of rules).

Content manager 244 may receive a request for raw data 230 in data storage unit 242 from user 260. The content manager applies the corresponding data usage configuration (or data usage controls) to provide data satisfying the request to user 260. By way of example, the data usage configuration associated with user 260 may indicate a type of obfuscation for portions of raw data 230, and provide obfuscated dataset 265 to user 260. Further, content manager 244 may receive a request for raw data 230 in data storage unit 242 from user 270. The content manager applies the corresponding data usage configuration (or data usage controls) to provide data satisfying the request to user 270. For example, the data usage configuration associated with user 270 may indicate another type of obfuscation for portions of raw data 230, and provide obfuscated dataset 275 to user 270. Alternatively, content manager 244 may generate partitions in data storage unit 242 containing data complying with the corresponding data usage configuration (e.g., obfuscated data, etc.), and retrieve the data for the request from a corresponding partition.

Figure 3:
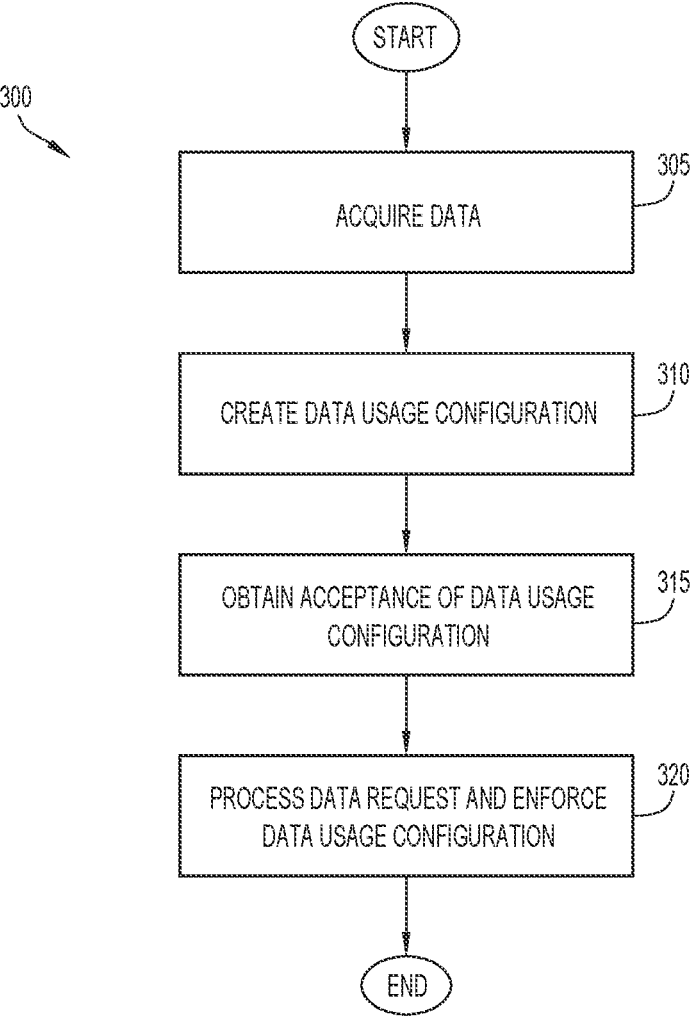
FIG. 3 is procedural flowchart illustrating a manner of creating and implementing a data usage configuration according to an embodiment of the present invention.

A manner of creating and implementing a data usage configuration according to an embodiment of the present invention is illustrated in FIG. 3. Initially, a data usage configuration (e.g., including data usage controls, etc.) may represent a legal or other framework for data access. A subject or source with respect to a data usage configuration generally refers to a source of the data (e.g., for studies gathering data from human participants, the human participants are the subjects). An owner with respect to a data usage configuration generally refers to a party with a legal or other right to use the data and to define a data usage configuration for other uses. A collector with respect to a data usage configuration generally refers to a party capturing the data. This may be a separate organization from the data owner. A provider or custodian with respect to a data usage configuration generally refers to a party that receives the data from the collector and stores the original data. The provider is responsible for distributing the data as delegated by the owner. A requestor or consumer with respect to a data usage configuration generally refers to a party requesting or being granted access to the data under the data usage configuration. Once a consumer has a copy of the data, the consumer may become a custodian of some form. The data usage configuration describes the data offered (e.g., format, provenance, quality, access technique, etc.) by a provider and what a requestor may do with the data (e.g., scope of a study, restrictions on redistribution, security controls, constraints on publishing, etc.).

A dataset is acquired by a collector at operation 305. By way of example, protected health information (PHI) may be collected by the collector (e.g., via a computer system 101) and stored by a provider or custodian (e.g., in data storage unit 242 via a computer system 101, etc.). However, any sensitive or other data may be collected and controlled. The provider may de-identify or obfuscate the dataset (e.g., create a limited dataset via a computer system 101, etc.), thereby reducing a regulatory burden on down-stream data consumers. The obfuscation may include any conventional or other techniques (e.g., masking of certain data, modifying or genericizing data to be applicable to a greater number of people, etc.).

The data owner defines or provides data usage requirements for the collected data (e.g., permitted actions, prohibited actions, obfuscation, etc.). The requirements are typically in textual (or other human readable form), and may include, or be derived from, any regulatory or other documents (e.g., Health Insurance Portability and Accountability Act (HIPAA), General Data Protection Regulation (GDPR), data users' institutional bylaws, contract or contract terms between a data owner and a data user, etc.). Content manager

244 processes the textual requirements to create a data usage configuration by extracting metadata (e.g., representing the data usage configuration) from the collected data at operation 310 (e.g. to generate data usage controls or rules). The data usage configuration (and metadata) may include components for owner and provider, roles, a term/duration, an early termination, a termination, sub-consumers, restrictions on sub-licensing, a data dictionary, a summary, a purpose, duplication/active, a classification, a regulatory classification or parent data usage configuration, physical handling restrictions, environment conditions, breach reporting, value, derived data, processes, and/or required training.

The owner and provider component indicates contact information for the owner and provider. The roles component indicates the classes to which a user may belong. The term/duration component indicates a timeframe the data may be used under the data usage configuration. The early termination component indicates under what conditions can the data usage configuration be terminated before the term ends. The termination component indicates the actions a consumer and provider perform upon termination, either scheduled or early. The sub-consumers component indicates those in a consumer organization permitted access, while the restrictions on sub-licensing component indicates whether the consumer may grant access to another third party. The data dictionary component indicates a schema or other description of the data structure, fields, and semantics, while the summary component indicates a description of the quantity and quality of the data. The purpose component indicates prescriptive and/or prohibitive actions (e.g., a consumer may not attempt to re-identify data or contact subjects, etc.). The duplication/active component indicates a restriction on the number of data copies in-use by a consumer, while the classification component indicates an owner classification of the data (e.g., this should come from a common vocabulary).

The regulatory classification component indicates a (U.S. or other) Government classification of the data and/or links to a parent data usage configuration. This may include a parent data usage configuration required by law or other requirements, where the parent data usage configuration may impose constrains or prohibitions on the child data usage configurations. For example, a regulation may require that protected health information (PHI) be encrypted at rest. A child data usage configuration may be regulated by one or more parent data usage configurations (e.g., national and state law, etc.). In this case, a mechanism detects and resolves any conflicts (e.g., one set of requirements may be given priority over the other, the requirements may be merged or combined, etc.).

The physical handling restrictions component indicates (prescriptive) rules on where the data can be stored and processed, or (prohibitive) rules where the data cannot be stored or processed. This may include geographic locations as well as devices, such as USB drives, personal computers, etc. The environment requirements component indicates (a precondition) that a consumer must use reasonable safeguards to prevent unpermitted use or disclosure of the data (e.g., encryption at rest or in-transit, etc.).

The breach reporting component indicates reporting requirements in the event of unpermitted use or disclosure of the data. The value component indicates a (monetary or other) value of the data as may be associated with any breach. The derived data component indicates rights to publish/retain data derived from computations on the data. The processes component indicates processes that must be implemented/defined (e.g., a dataset removal process, etc.).

In addition, the required training component indicates trainings (precondition) a data user needs to take for obtaining access rights.

Once the data usage configuration (and data usage controls) is created, content manager 244 presents the data usage configuration to a user (e.g., via a user interface of a client or end-user system 103) for acceptance at operation 315. In this case, a potential consumer acknowledges, accepts, and demonstrates compliance with any pre-conditions of the data usage configuration. Many owners may not have a structured data usage configuration as described above. In this case, organizations interested in driving their data management policy with a data usage configuration may create the metadata as part of their initial data ingest from an owner textual version of data requirements.

The data usage configuration (or metadata) is used to enforce a data governance/management policy. Manners in which the metadata may be used to enforce data governance/management are described below. In order to facilitate enforcement, content manager 244 may maintain descriptive metadata, such as that used in the data usage configuration. The content manager may ensure that either: the metadata is collocated with any copies of the data; or any data manipulation mechanism can locate and access the metadata for the data.

Once the data usage configuration is created and accepted, content manager 244 may enforce the data usage configuration (or data usage controls) for data requests at operation 320. For example, data manipulation (e.g., copy) events consult the data usage configuration (e.g., via content manager 244) to verify the destination location is permitted. This may include temporary RAM copies for computation, and regulatory restrictions. The data can be further limited (e.g. fields removed or values obfuscated) based on sub-consumer roles. Further, data duplication and basic use can be controlled (e.g., number of active readers, etc.) based on the data usage configuration.

Further, the data usage configuration may be attached with the data. When a user attempts to retrieve the dataset from data storage unit 242, the user receives a capsule (e.g., a docker image), where control logic of the capsule controls how the data is to be accessed according to the data usage configuration even after the capsule is moved to a different cloud or compute environment.

Once the data usage configuration terminates or expires, all copies of the data are identified and sequestered (made unusable) or deleted based on termination conditions of the data usage configuration.

Figure 4:
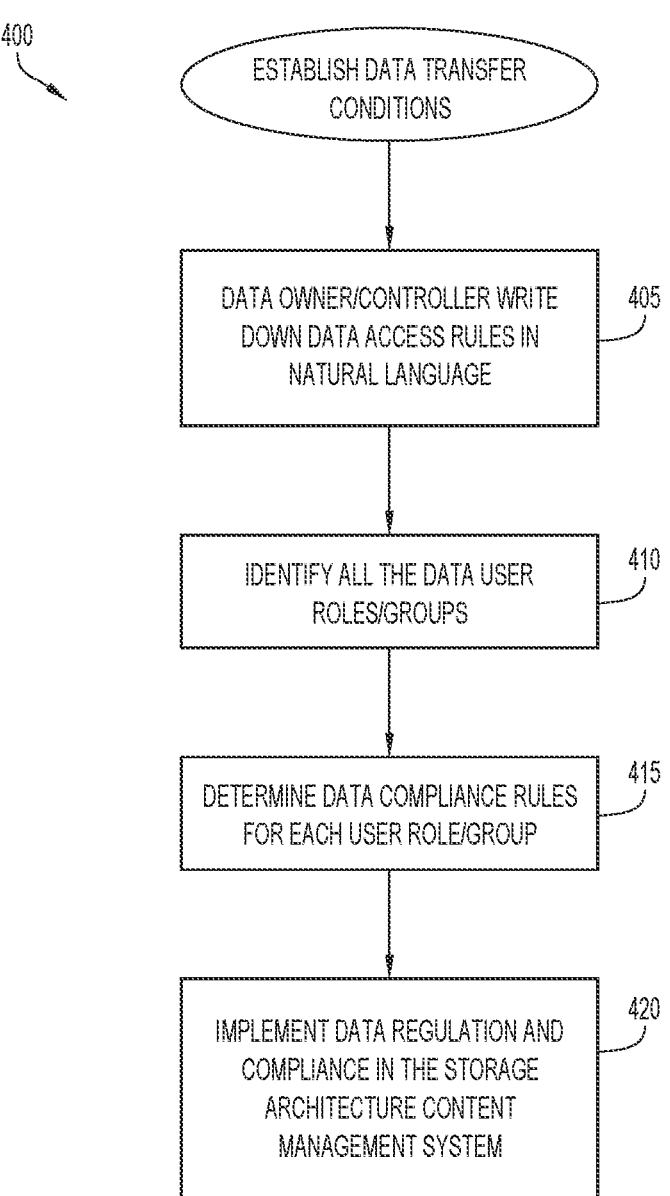
FIG. 4 is a procedural flowchart illustrating a manner of creating a data usage configuration according to an embodiment of the present invention.

A method 400 of creating a data usage configuration (e.g., via content manager 244) according to an embodiment of the present invention is illustrated in FIG. 4. Initially, data transfer conditions (or requirements) are established for a dataset. A data owner or data controller determines and produces data rules in a natural language (e.g., text, etc.) at operation 405 for the data transfer conditions. The data rules may be provided from, or in the form of, any regulatory or other documents (e.g., Health Insurance Portability and Accountability Act (HIPAA), General Data Protection Regulation (GDPR), data users' institutional bylaws, contract or contract terms between a data owner and a data user, etc.).

User roles and groups for the data are determined from the textual data rules at operation 410, and data usage configurations (e.g., including a set of data usage controls or rules) are generated for each role or user group at operation 415. For example, content manager 244 may process the natural language data rules to extract the metadata and create the data usage configuration. Further, a template-based approach may be used. Templates or blueprints are created for generating data usage configurations that capture the required configurations, software stack, and dependencies (e.g., for specific research studies, etc.) that allow users or teams to select and deploy the appropriate template to create data usage controls for provisioning a workbench or application environment to support a scenario (e.g., research study mission, etc.) on the proper performant infrastructure footprint that can scale elastically as needed. This automates the deployment process to ensure consistency, repeatability, and efficiency.

By way of example, elements of a template for a data usage configuration may include: a data dictionary for data being exchanged (e.g., variable1, characteristics1, personally identifiable information (PII), protected health information (PHI), etc.); a duration including time and/or disposal instructions (e.g., dates or times for retain, delete, delete with overwrite, etc.); controls for residency, sovereignty, and/or access (e.g., country of residency, data to remain in the U.S., accessible from which countries, etc.); regulatory controls (e.g., Health Insurance Portability and Accountability Act (HIPAA), General Data Protection Regulation (GDPR), etc.); withdraw-for-use requirements including data that requires masking and/or data that requires removal (e.g., masking, removal, allowed combinations, etc.); and/or acceptable combinations of data types for withdrawing. However, the template may include any information for a data usage configuration arranged in any fashion, such as the metadata described above.

Content manager 244 may process natural language text of a document to extract the metadata or information for generating the data usage configurations. For example, content manager 244 may employ a machine learning model to extract the metadata from a natural language document (e.g., complete a template, etc.). The machine learning model may include any quantity of any conventional or other machine learning and/or natural language processing (NLP) models (e.g., mathematical/statistical models, classifiers, feed-forward (fully or partially connected), recurrent (RNN), convolutional (CNN), or other neural networks, deep learning models, long short-term memory (LSTM), attention-based methods/transformers, Large Language Model (LLM), entity extraction, relationship extraction, part-of-speech (POS) taggers, semantic analysis, etc.).

By way of example, content manager 244 may employ any conventional or other Large Language Model (LLM) and natural language processing (NLP) techniques to convert a natural language document (e.g., legal or other agreement, etc.) into a data usage configuration. These technologies can parse and understand the legal or other text, extracting key elements, such as parties involved, data types, access rules, termination conditions, and other relevant information. This information can then be structured and formatted into the metadata (or template) to form the data usage configuration (or data usage controls or rules), which can be used to enforce data governance and management policies. The use of NLP and/or LLM automatically creates metadata for the data usage configurations (e.g., as regulations or requirements change, etc.), thereby increasing efficiency to maintain compliance with the regulations or requirements as they change.

The Large Language Model (LLM) receives a prompt or natural language instruction and a document, and processes the prompt to extract the information from the document for the data usage configuration. The prompt may include several variations and forms. By way of example, the information in a prompt preferably includes an instruction to receive a legal or other document as input, and the relevant information to extract. The prompt may further include a template to complete. For example, a prompt may include the following expression: "You are an expert in both legal document analysis and programming. We will provide you with an agreement. It contains the terms that the data owner would like to enforce on the data user. You will extract relevant information from the agreement and fill out the provided template for the downstream system to enforce the rules."

The prompt language to utilize may be obtained by generating various candidate prompts and determining metrics based on the output of the Large Language Model (LLM) (or resulting extracted information) relative to desired or known information to be extracted. The prompts or prompt language achieving greatest accuracy may be used for the prompt provided to the LLM to extract the metadata for the data usage configuration.

Once the data usage configurations are created, they are implemented (e.g., by a content management system) in storage architecture 240 at operation 420 for managing data.

Figure 5:
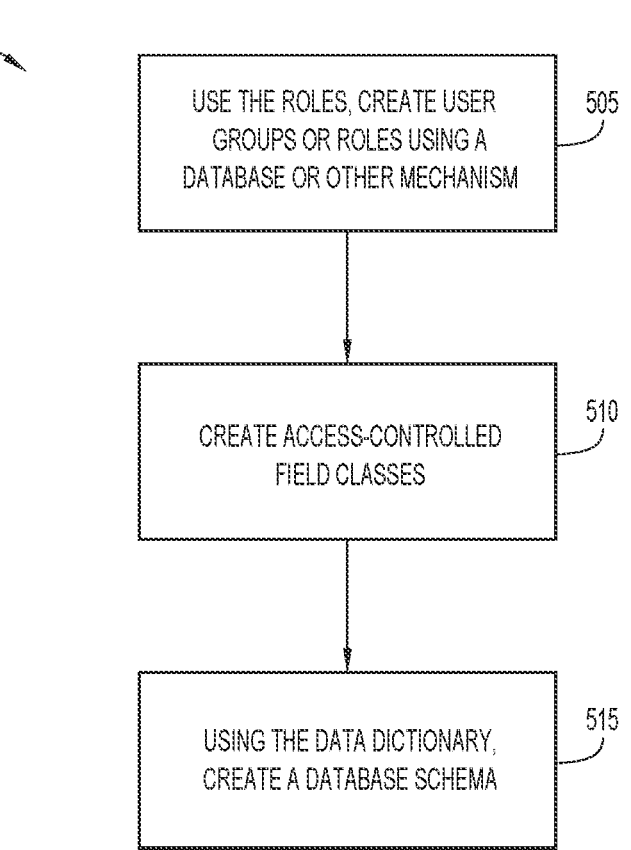
FIG. 5 is a procedural flowchart illustrating a manner of creating a database schema for implementing a data usage configuration in a database according to an embodiment of the present invention.

A method 500 of creating a database schema for implementing a data usage configuration in a database (e.g., via data storage unit 242, content manager 244, computer 101, remote server 104, and/or database 130) according to an embodiment of the present invention is illustrated in FIG. 5. Initially, a textual document is processed to extract the information or metadata for a data usage configuration as described above. Content manager 244 creates a user groups or roles table in a database or other storage structure (e.g., data storage unit 242, database 130, etc.) based on the metadata at operation 505. For example, roles may be captured in the metadata and/or inherited from a parent data usage configuration. The table may include rows for each role and columns indicating the role and corresponding description.

By way of example, the roles of the table may include: Subject with a corresponding description (e.g., the person or entity whose data has been captured. For example, the address of a patient in a clinical trial); Owner with a corresponding description (e.g., the organization that collected and has the data copyright); Steward with a corresponding description (e.g., an organization the owner has entrusted to manage the data); Group1 with no description; Group2 with no description; and Other with a corresponding description (e.g., low permission default group). In an embodiment, roles can be implemented by roles of a database system.

Content manager 244 creates access-controlled field classes in a table of a database or other storage structure (e.g., data storage unit 242, database 130, etc.) at operation 510. For example, the field classes may be captured in the metadata for the data usage configuration. The table may include rows for each class and columns indicating the field class and corresponding access control.

By way of example, the field classes of the table may include: PI with a corresponding access control (e.g., deny all all; allow read, write Owner; allow read Other); SPI-1 with a corresponding access control (e.g., deny all all; allow read, write Owner; allow read, write Group1); SPI-2 with a corresponding access control (e.g., deny all all; allow read, write Owner; allow read, write Group2). An access control includes an action (e.g., allow, deny, etc.), permissions (e.g., read, write, obfuscated-read, etc.) and role (described above). For example, the syntax of an access control may be expressed as <action> <permissions> <role>. Access control statements are cumulative. However, the access control may include any information, arrangement, and/or format.

An embodiment may use a database system that allows a developer to create custom data types. For example, a char-SPI (e.g., Sensitive Personal Information) field-type may be created based on a character field type. The defined char-SPI field type may be used to create database tables as specified by a data dictionary. Further, the database allows the developer to specify access to a field type based on a role of the user. A database with data obfuscation functions may also be used to define an obfuscated field that is accessible to the appropriate role group. In addition, the field types created may have an expiration date. Expiration can be enforced with a check function that can implement a data quarantine or destruction process.

Content manager 244 uses a data dictionary of the metadata to create a database schema for the data usage configuration at operation 515. The roles and field-types described above (e.g., operations 505 and 510) and the data dictionary defined in the data usage configuration are used to create one or more database schemas. Field types (e.g., SPI-1 and SPI-2 described above, etc.) may be used to define multiple levels of sensitive data each with its own access group (role) and permissions.

The data dictionary may be in the form of a table including rows for each field and columns indicating the field and corresponding field-class. By way of example, the data dictionary fields of the table may include: Name with a corresponding field-class (e.g., Personal Information (PI)); Private-address with a corresponding field class (e.g., Sensitive Personal Information (SPI)); and SSN with a corresponding field-class (e.g., Sensitive Personal Information (SPI)).

A field-class may further have groups of related Sensitive Personal Information (SPI). For example, the data dictionary fields of the table may include: Name with a corresponding field-class (e.g., Personal Information (PI)); Private-address with a corresponding field class (e.g., SPI-1); Private-phone with a corresponding field-class (e.g., SPI-1); SSN with a corresponding field-class (e.g., (SPI-1)); and Business-address with a corresponding field-class (e.g., SPI-2)).

A parent data usage configuration constrains how a child data usage configuration may be defined. For example, when a parent data usage configuration defines a field of class SPI and restricts which roles can access the data, the child data usage configuration cannot define a local data dictionary and role-ACL binding that violates the parent data usage configuration. Alternatively, a warning may be generated when the child data usage configuration does define a non-compliant data dictionary.

The process uses the metadata for the data usage configuration that may have been created manually or by some semi-automated process, based partially on a licensing legal or other document. The structure for the data usage configuration may alternatively include one or more name-value lists. Obfuscate and other control functions may also be implemented in a translation layer that sits between the database and user. The data usage configuration may be implemented by any tables or other structures, may include any information arranged in any fashion and/or format, and may include data usage controls or rules having any information/actions and arranged in any fashion and/or format.

Figure 6:
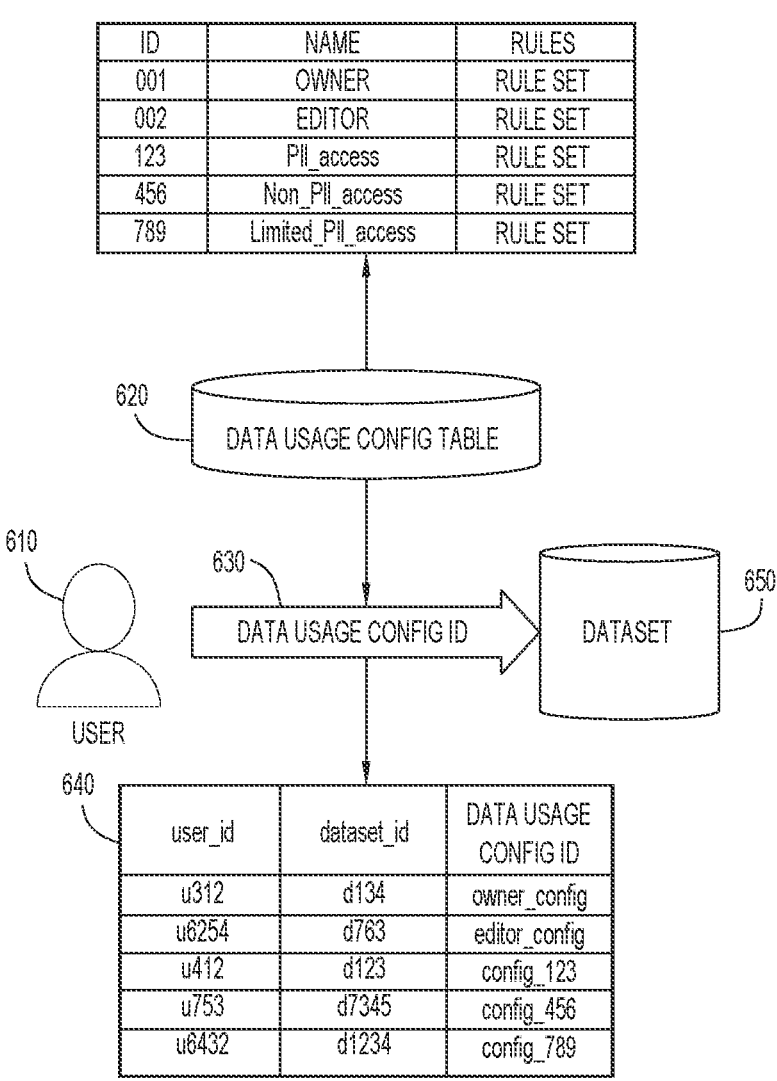
FIG. 6 is a flow diagram of accessing a data usage configuration for a dataset according to an embodiment of the present invention.

Accessing a data usage configuration for a dataset according to an embodiment of the present invention is illustrated in FIG. 6. Initially, various data usage configurations are generated and stored in a data usage configuration table 620 (e.g., of data storage unit 242, database 130, etc.). By way of example, the data usage configuration table includes a row for each data usage configuration and columns indicating a data usage configuration identification, a name of the data usage configuration, and a rule set specifying data access and usage. Table 620 may include or utilize the classes, attributes, and other aspects of the database schema described above.

For example, the data usage configuration may be implemented as a structured Query Language (SQL) many-to-many relationship, where each user and each dataset can have only one type of data usage configuration linking them. The types of data usage configurations may include: an owner (or administrator) that is inherited from a system/platform default_owner configuration upon dataset creation; default_owner configuration that can add/remove other users and change permissions and the data usage configurations and has all the editor privileges; editor configuration that is inherited from a system/platform default_editor configuration upon dataset creation; default_editor configuration that can change the content of the dataset and push commits back to the dataset; user configuration that includes a special data usage configuration defined during the data request process that defines whether this user can access certain PIIs and the length (time).

Default templates/versions may be provided to simplify the creation process and may be customized. The customization process enables a new type entry to be created in the data usage configuration table 620, and the data usage configuration identification is placed in relationship table 640 described below.

Relationship table 640 may indicate relationships between users, datasets, and data usage configurations. By way of example, table 640 includes a row for each data usage configuration with columns indicating a user identification, a dataset identification, and a data usage configuration identification. When a user and a dataset have no relationship entry in relationship table 640, this indicates a preview relationship for the dataset. This reduces space in relationship table 640 by not storing an exponentially increased amount of preview-pair between most users and datasets. The preview data usage configuration for the preview relationship provides a view of the data defined by a dataset owner during a data intake and curation process. It may be stored as a child object in the dataset, and may be used for rendering the dataset.

A user 610 (e.g., via a client or end-user system 103, etc.) requests access to a dataset 650 in data storage unit 242 managed by content manager 244. The user provides various credentials and a desired dataset (e.g., a user identification, a dataset identification, etc.). The user and dataset identifications may be applied to table 640 to identify a corresponding data usage configuration identification. The data usage configuration identification is applied to data usage configuration table 620 to identify the corresponding data usage configuration and retrieve the associated rule set. The request is processed in accordance with the rule set to control access and usage of the requested dataset.

Figure 7:
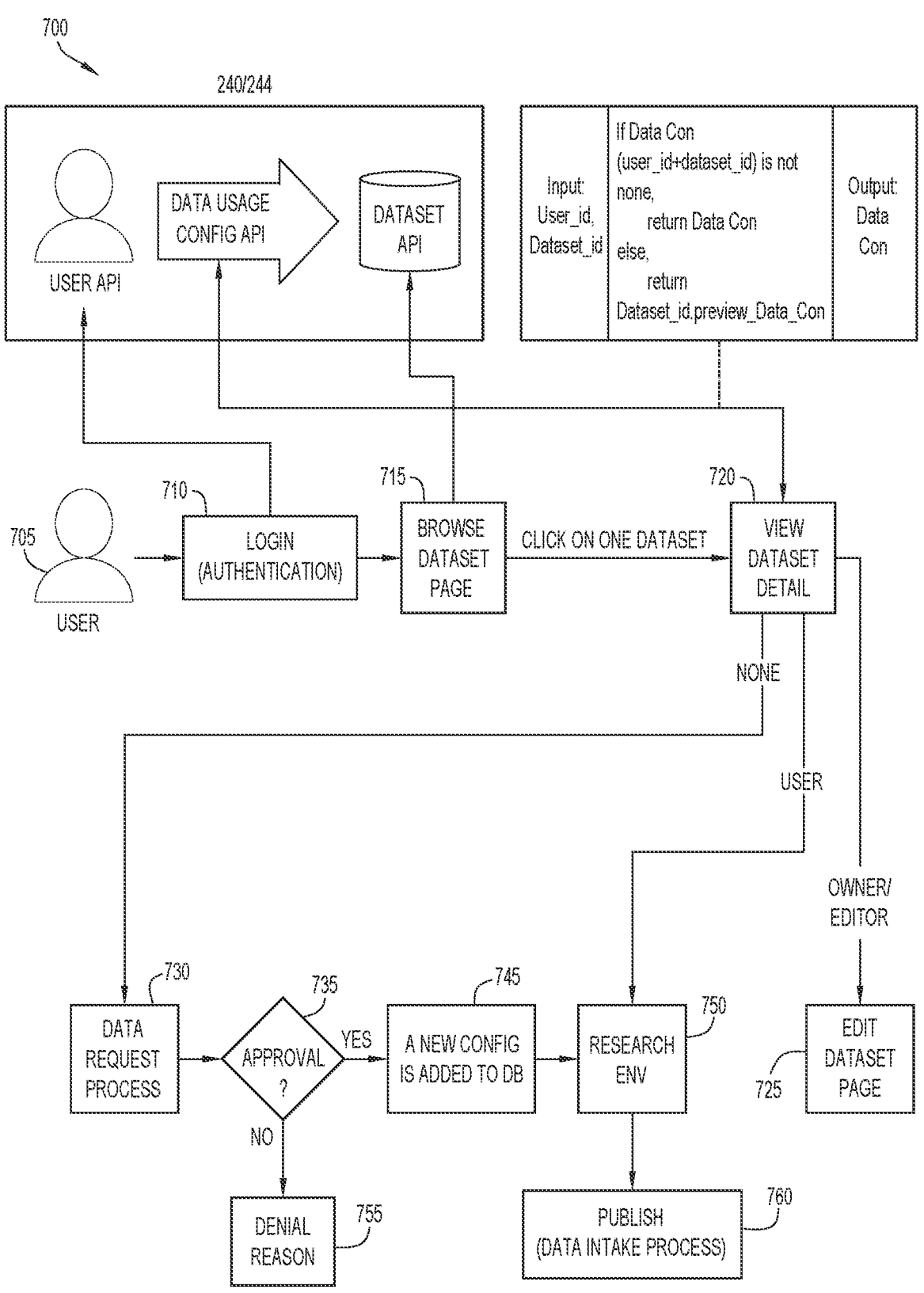
FIG. 7 is a procedural flowchart of a manner of accessing a dataset in accordance with a data usage configuration according to an embodiment of the present invention.

A method 700 of accessing a dataset in accordance with a data usage configuration according to an embodiment of the present invention is illustrated in FIG. 7. Initially, various data usage configurations may be generated and stored in substantially the same manner described above. A user 705 logs in to and provides user credentials (e.g., user name or identification, password, etc.) to content manager 244 for authentication at operation 710. A user application programming interface (API) (e.g., of storage architecture 240 and/or content manager 244) authenticates the user based on the user credentials.

Content manager 244 retrieves and presents information from data storage unit 242 (e.g., via a dataset API of storage architecture 240 and/or content manager 244) identifying datasets according to various criteria at operation 715. The information may be presented on a user interface (e.g., of a computer system 103) for selection of a dataset by a user. The user can use filter rules to change the list of datasets being displayed. The filter rules may include location (e.g., dataset sovereignty), dataset tags (e.g., disease, data type (e.g., x-ray, etc.), hospital, or any other criteria. The information for each dataset is driven by the preview data usage configuration.

Once a dataset is selected, content manager 244 presents details of the dataset (e.g., on the user interface of computer system 103, etc.) in accordance with a corresponding data usage configuration at operation 720. The corresponding data usage configuration may be retrieved based on a user identification and an identification of the selected dataset as described above. The information and allowed actions from the user interface are determined by the corresponding data usage configuration.

When the user is an owner or editor, content manager 244 enables the user to edit the dataset on the user interface at operation 725.

When no data usage configuration exists for the user and dataset, content manager 244 requests access (e.g., from a data owner, etc.) at operation 730. When the request is denied as determined at operation 735, content manager 244 provides a reason for the denial on the user interface at operation 755. When the request is approved as determined at operation 735, a new data usage configuration is generated in substantially the same manner described above (e.g., based on a document indicating data access requirements, etc.) and added to the database (e.g., data storage unit 242, database 130, etc.) at operation 745. The requested data is provided to a research or other computing environment (e.g., remote, local, etc.) at operation 750. The usage of the data in the environment is controlled by the data usage configuration.

For example, data manipulation (e.g., copy) events in the environment consult the data usage configuration (e.g., via content manager 244) to verify the destination location is permitted. This may include temporary RAM copies for computation, and regulatory restrictions. The data can be further limited (e.g., fields removed or values obfuscated) based on sub-consumer roles. Further, data duplication and basic use can be controlled (e.g., number of active readers, etc.) based on the data usage configuration. Moreover, the data usage configuration may be attached with the data. When a user attempts to retrieve the dataset from data storage unit 242, the user receives a capsule (e.g., a docker image), where control logic of the capsule controls how the data is to be accessed according to the data usage configuration even after the capsule is moved to a different cloud or compute environment.

When the user has a user status, the requested data is provided to the research or other computing environment at operation 750, where the usage of the data in the environment is controlled by the data usage configuration in substantially the same manner described above.

Data resulting from the research or other computing environment (e.g., computations, derived data, etc.) may be published according to the data usage configuration at operation 755.

Present invention embodiments may provide various technical and other advantages. For example, present invention embodiments provide enhanced manners of accessing and controlling usage of data based on textual data requirements of a document. The document is analyzed to automatically extract information to generate a data usage configuration with data usage controls or rules. The data usage configuration is implemented to control access and usage of the data in a computing environment. The use of NLP and/or LLM automatically creates metadata for the data usage configurations as regulations or requirements change, thereby adapting (or changing configurations for data and security systems) to maintain compliance with the regulations or requirements as they change. This may be accomplished in real-time or near real-time. For example, the system may receive requirement changes (e.g., revised or newly published documents, etc.) directly from sources and automatically update the data usage configurations, database schemas, partitions, and/or systems. Further, the extracted metadata may be used to automatically partition data storage units and provide data in compliance with the data usage configuration (e.g., also as requirements change as described above).

It will be appreciated that the embodiments described above and illustrated in the drawings represent only a few of the many ways of implementing embodiments for controlling access and utilization of data based on computerized generation of data usage controls.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., data control code 200, content manager 244, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., requested data, datasets, data usage configurations, requirement documents, metadata, templates, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., requested data, datasets, data usage configurations, requirement documents, metadata, templates, etc.).

The present invention embodiments are not limited to the specific tasks or algorithms described above, but may be utilized for automatically generating and enforcing data usage controls based on requirements in any textual or other human readable form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of controlling access and usage of data comprising:

generating, via at least one processor, a data usage configuration from a document specifying requirements for a dataset in a natural language, wherein the data usage configuration indicates:

access rules, and a plurality of types of obfuscation on the dataset, wherein at least one of the plurality of types of obfuscation on the dataset is based on an access level of a user of a plurality of users;

retrieving, via the at least one processor, at least a portion of the dataset from a data storage unit in accordance with the data usage configuration;

controlling, via the at least one processor, operations performed on the dataset based on the data usage configuration; and providing, via the at least one processor, obfuscated data, according to the at least one of the plurality of types of obfuscation, and in response to a request associated with the user.

2. The method of claim 1, wherein the data usage configuration is collocated with the dataset, and wherein controlling the operations performed on the dataset comprises:

controlling the operations performed on the dataset in a remote computing environment.

3. The method of claim 1, wherein the data usage configuration is generated based on metadata.

4. The method of claim 1, wherein controlling the operations performed on the dataset comprises:

controlling the operations performed on the dataset in a remote computing environment that accesses the data usage configuration for the dataset.

5. The method of claim 1, further comprising: performing, via the at least one processor, actions upon expiration of the data usage configuration including sequestering or deleting copies of the dataset.

6. The method of claim 1, wherein generating the data usage configuration from the document comprises:

processing the document via a Large Language Model (LLM) to extract metadata for the data usage configuration based on a prompt including instructions for the LLM in a natural language; and generating the data usage configuration based on the extracted metadata.

7. The method of claim 6, wherein generating the data usage configuration based on the extracted metadata comprises:

generating a database schema representing the data usage configuration based on the extracted metadata.

8. The method of claim 1, wherein generating the data usage configuration from the document comprises:

extracting information from the document for the data usage configuration, wherein the information includes: owner and provider information, duration of the data usage configuration, conditions for early termination, actions upon termination of the data usage configuration, organization members permitted access, restrictions on sub-licensing, a data dictionary, a summary of the dataset, a purpose, restriction on data copies, owner classification of the dataset, authority classification, physical handling restrictions, environment requirements, reporting requirements for a breach, a value of the dataset associated with a breach, rights to derived data, and training requirements.

9. A system for controlling access and usage of data comprising:

one or more memories; and at least one processor coupled to the one or more memories and configured to:

generate a data usage configuration from a document specifying requirements for a dataset in a natural language, wherein the data usage configuration indicates;

access rules, and a plurality of types of obfuscation on the dataset, wherein at least one of the plurality of types of obfuscation on the dataset is based on an access level of a user of a plurality of users;

retrieve at least a portion of the dataset from a data storage unit in accordance with the data usage configuration;

control operations performed on the dataset based on the data usage configuration; and provide obfuscated data, according to the at least one of the plurality of types of obfuscation, and in response to a request associated with the user.

10. The system of claim 9, wherein the data usage configuration is collocated with the dataset, and wherein controlling the operations performed on the dataset comprises:

controlling the operations performed on the dataset in a remote computing environment.

11. The system of claim 9, wherein the data usage configuration is generated based on metadata.

12. The system of claim 9, wherein controlling the operations performed on the dataset comprises:

controlling the operations performed on the dataset in a remote computing environment that accesses the data usage configuration for the dataset.

13. The system of claim 9, wherein the at least one processor is further configured to:

perform actions upon expiration of the data usage configuration including sequestering or deleting copies of the dataset.

14. The system of claim 9, wherein generating the data usage configuration from the document comprises:

processing the document via a Large Language Model (LLM) to extract metadata for the data usage configuration based on a prompt including instructions for the LLM in a natural language; and generating the data usage configuration based on the extracted metadata.

15. The system of claim 14, wherein generating the data usage configuration based on the extracted metadata comprises:

generating a database schema representing the data usage configuration based on the extracted metadata.

16. The system of claim 9, wherein generating the data usage configuration from the document comprises:

extracting information from the document for the data usage configuration, wherein the information includes: owner and provider information, duration of the data usage configuration, conditions for early termination, actions upon termination of the data usage configuration, organization members permitted access, restrictions on sub-licensing, a data dictionary, a summary of the dataset, a purpose, restriction on data copies, owner classification of the dataset, authority classification, physical handling restrictions, environment requirements, reporting requirements for a breach, a value of the dataset associated with a breach, rights to derived data, and training requirements.

17. A computer program product for controlling access and usage of data, the computer program product comprising one or more computer readable storage media having program instructions collectively stored on the one or more computer readable storage media, the program instructions executable by at least one processor to cause the at least one processor to:

generate a data usage configuration from a document specifying requirements for a dataset in a natural language, wherein the data usage configuration indicates:

access rules, and a plurality of types of obfuscation on the dataset, wherein at least one of the plurality of types of obfuscation on the dataset is based on an access level of a user of a plurality of users;

retrieve at least a portion of the dataset from a data storage unit in accordance with the data usage configuration;

control operations performed on the dataset based on the data usage configuration; and provide obfuscated data, according to the at least one of the plurality of types of obfuscation, and in response to a request associated with the user.

18. The computer program product of claim 17, wherein the data usage configuration is collocated with the dataset, and wherein controlling the operations performed on the dataset comprises:

controlling the operations performed on the dataset in a remote computing environment.

19. The computer program product of claim 17, wherein the data usage configuration is generated based on metadata.

20. The computer program product of claim 17, wherein controlling the operations performed on the dataset comprises:

controlling the operations performed on the dataset in a remote computing environment that accesses the data usage configuration for the dataset.

21. The computer program product of claim 17, wherein the program instructions further cause the at least one processor to:

perform actions upon expiration of the data usage configuration including sequestering or deleting copies of the dataset.

22. The computer program product of claim 17, wherein generating the data usage configuration from the document comprises:

processing the document via a Large Language Model (LLM) to extract metadata for the data usage configuration based on a prompt including instructions for the LLM in a natural language; and generating the data usage configuration based on the extracted metadata.

23. The computer program product of claim 22, wherein generating the data usage configuration based on the extracted metadata comprises:

generating a database schema representing the data usage configuration based on the extracted metadata.

24. The computer program product of claim 17, wherein generating the data usage configuration from the document comprises:

extracting information from the document for the data usage configuration, wherein the information includes: owner and provider information, duration of the data usage configuration, conditions for early termination, actions upon termination of the data usage configuration, organization members permitted access, restrictions on sub-licensing, a data dictionary, a summary of the dataset, a purpose, restriction on data copies, owner classification of the dataset, authority classification, physical handling restrictions, environment requirements, reporting requirements for a breach, a value of the dataset associated with a breach, rights to derived data, and training requirements.

* * * * *